United States Patent
Solenthaler et al.

(10) Patent No.: US 11,247,294 B2
(45) Date of Patent: Feb. 15, 2022

(54) DEVICE FOR WELDING COMPONENTS BY MEANS OF ULTRASOUND

(71) Applicant: Telsonic Holding AG, Bronschhofen (CH)

(72) Inventors: Peter Solenthaler, St. Margarethen (CH); Thomas Hünig, Grosswallstadt (DE)

(73) Assignee: Telsonic Holding AG, Bronschhofen (CH)

( * ) Notice: Subject to any disclaimer, the term of this patent is extended or adjusted under 35 U.S.C. 154(b) by 155 days.

(21) Appl. No.: 16/700,349

(22) Filed: Dec. 2, 2019

(65) Prior Publication Data

US 2020/0171598 A1 Jun. 4, 2020

Related U.S. Application Data

(62) Division of application No. 15/740,191, filed as application No. PCT/EP2016/064360 on Jun. 22, 2016, now Pat. No. 10,532,424.

(30) Foreign Application Priority Data

Jun. 30, 2015 (WO) ................. PCT/EP2015/064889

(51) Int. Cl.
*B32B 7/00* (2019.01)
*B23K 20/10* (2006.01)
(Continued)

(52) U.S. Cl.
CPC .............. *B23K 20/106* (2013.01); *B06B 3/00* (2013.01); *B29C 65/082* (2013.01); *B07B 2230/04* (2013.01)

(58) Field of Classification Search
USPC ........................................................ 156/73.1
See application file for complete search history.

(56) References Cited

U.S. PATENT DOCUMENTS 3,184,841 A 5/1965 Jones et al.
3,602,420 A 8/1971 Wilkinson, Jr.
(Continued)

FOREIGN PATENT DOCUMENTS

DE 102 50 741 A1 5/2004
DE 20 2008 007 271 U1 9/2008
(Continued)

OTHER PUBLICATIONS

Indian Office Action issued in corresponding Indian Patent Application No. 201817000422 dated Jul. 3, 2020.
(Continued)

*Primary Examiner* — James D Sells
(74) *Attorney, Agent, or Firm* — Finch & Maloney, PLLC; Michael Bujold; Jay Franklin

(57) ABSTRACT

A device (10') for welding components by ultrasound. The device (10') comprises a sonotrode (11') having a sonotrode head (12') which can be excited by a vibration generator to produce torsion vibrations with respect to a torsion axis (T). At least one welding surface (14') is arranged on the peripheral side on the sonotrode head (12') with respect to the torsion axis (T). The device (10') also comprises a support device (15') which supports the sonotrode head (11') in a support area (16'), which contains a vibration node of the sonotrode head (12'). The support area (16') and the welding surface (14') at least partially extend along a common plane (E) which extends perpendicular to the torsion axis (T). A device (10') for welding components by ultrasound by using a temperature control device are also disclosed.

20 Claims, 9 Drawing Sheets

Figure 1A:
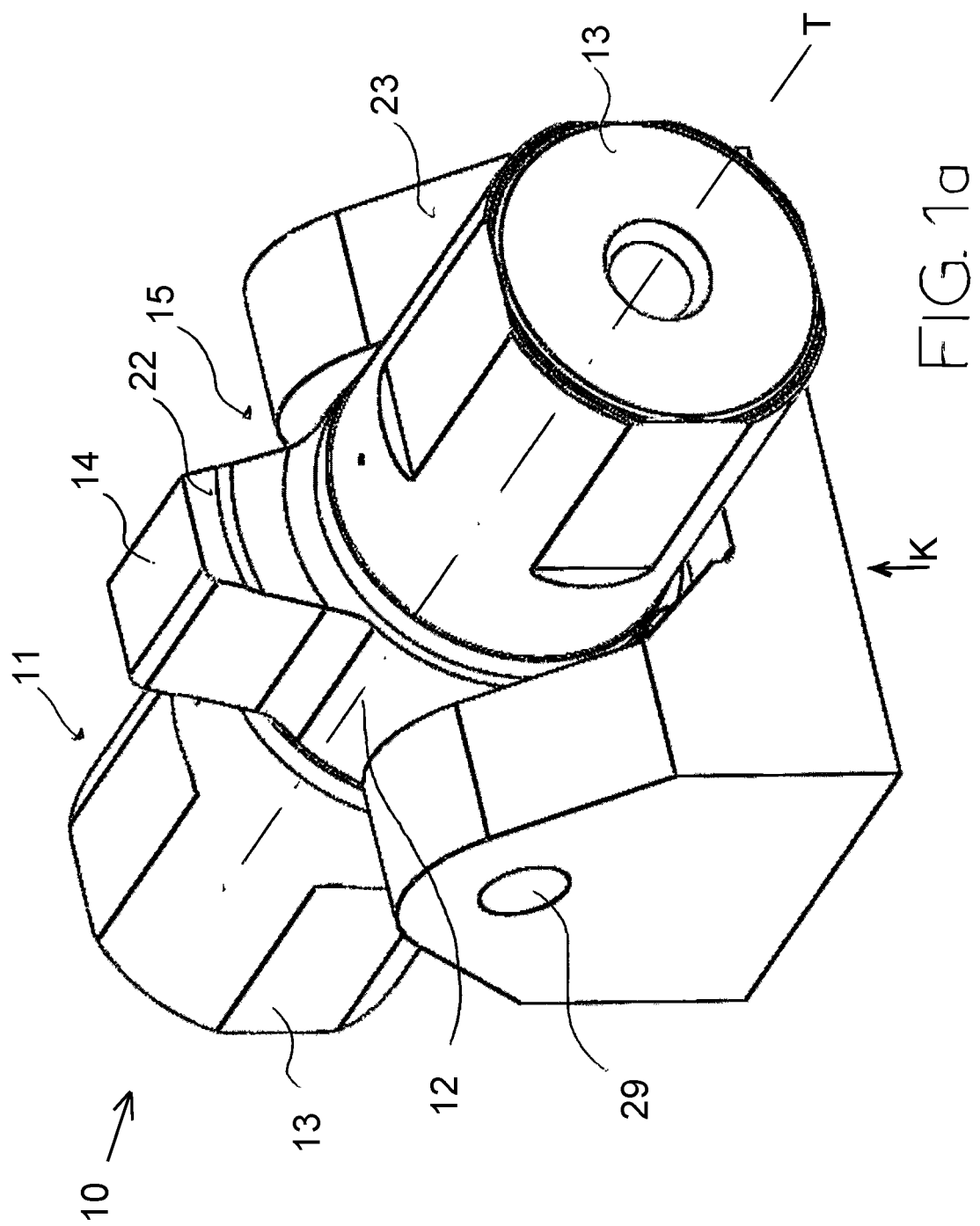

(51) Int. Cl.
*B06B 3/00* (2006.01)
*B29C 65/08* (2006.01)

(56) References Cited

U.S. PATENT DOCUMENTS

| | | | |
|---|---|---|---|
| 8,610,334 | B2 | 12/2013 | Bromfield |
| 8,858,742 | B2 * | 10/2014 | Spicer .................... B29C 65/08 156/64 |
| 8,986,478 | B2 | 3/2015 | Bücket et al. |
| 2003/0160084 | A1 | 8/2003 | Higashiyama |
| 2004/0112547 | A1 | 6/2004 | Tamamoto |
| 2010/0078115 | A1 | 4/2010 | Lang |
| 2010/0307660 | A1 | 12/2010 | Moeglich |
| 2015/0034229 | A1 * | 2/2015 | Ochs .................... B06B 3/00 156/73.1 |

FOREIGN PATENT DOCUMENTS

| | | |
|---|---|---|
| DE | 202013100866 U1 | 5/2013 |
| EP | 2 261 008 A1 | 12/2010 |
| JP | 2003165161 A | 6/2003 |
| JP | 2008142738 A | 6/2008 |
| WO | 02/061895 A1 | 8/2002 |
| WO | 2011/138404 A1 | 11/2011 |
| WO | 2012/069413 A1 | 5/2012 |

OTHER PUBLICATIONS

Japanese Office Action issued in corresponding Japanese Patent Application No. 2017-567417 dated Feb. 16, 2021.
International Search Report corresponding to PCT/EP2016/064360 dated Dec. 23, 2016.
International Search Report corresponding to PCT/EP2015/064889 dated Apr. 26, 2016.

* cited by examiner

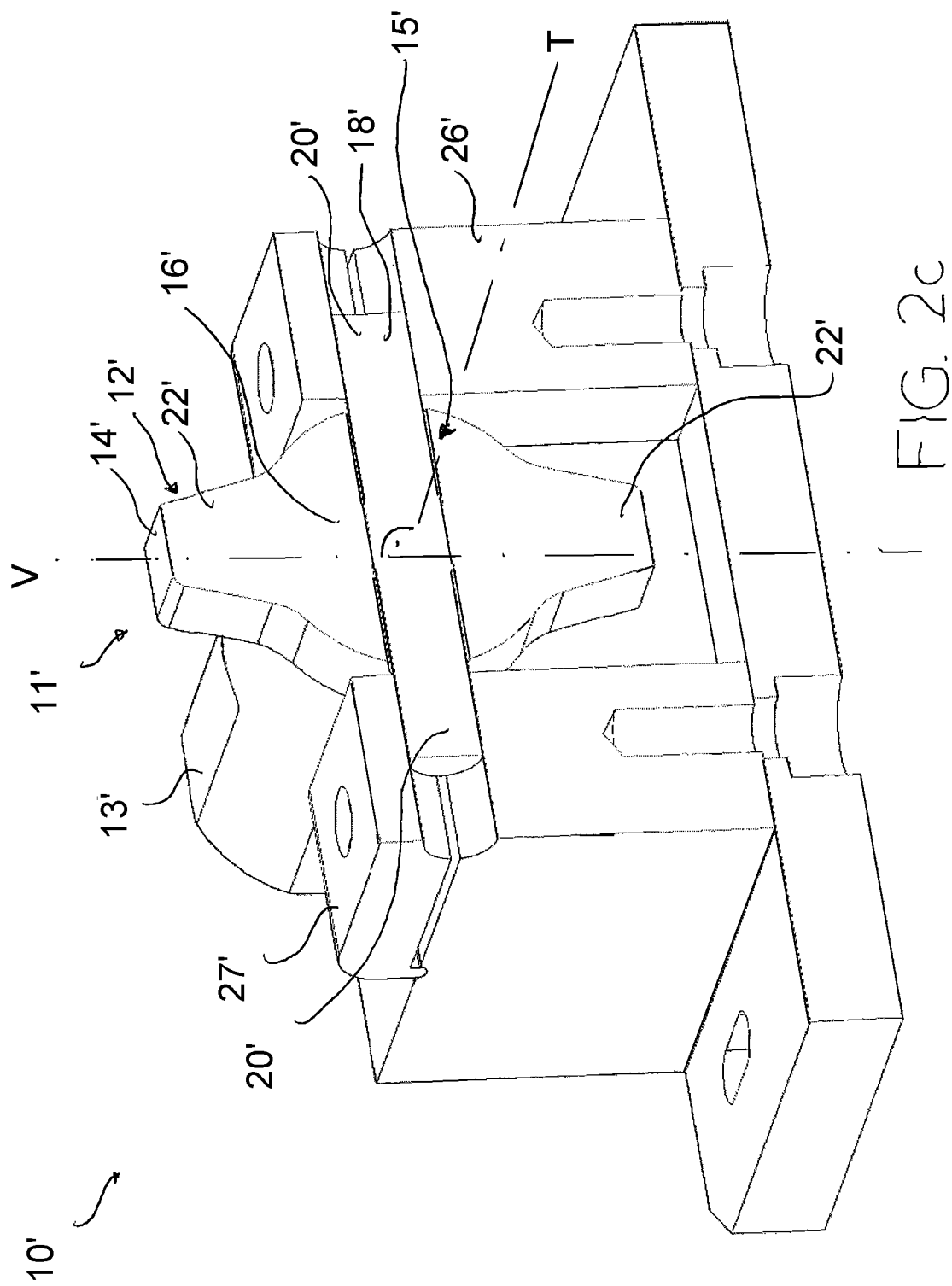

DEVICE FOR WELDING COMPONENTS BY MEANS OF ULTRASOUND

The present invention relates to devices for welding components by means of ultrasound with a supporting device for supporting a sonotrode head in accordance with the preambles of the independent patent claims.

Known supporting devices for sonotrode heads are attached at a location with a minimum amplitude (what is known as zero point support). This can achieve a situation where as little ultrasonic energy as possible is removed via the supporting device, which ultrasonic energy is to be provided for the actual welding operation. An undesired temperature rise at the supporting device can also be avoided as a result.

For instance, U.S. Pat. No. 3,184,841 discloses, for example, a torsion sonotrode which can be excited to perform torsional oscillations with the aid of ultrasonic transducers. The working face of the annular welding tip runs perpendicularly with respect to the torsion axis. The sonotrode is supported by a mass at an oscillation node.

WO 02/061895 A1 is concerned with the connection of electric conductors, which can be achieved, for example, by way of torsion sonotrodes or longitudinal oscillators. The longitudinal oscillators can be mounted at an oscillation node.

EP 2 261 008 A1 discloses further devices and methods for ultrasonic treatment. A sonotrode is excited to perform torsional ultrasonic oscillations. It has a slot, into which an engagement member of an anvil is introduced, with the result that a weld gap is formed for two plastic films to be welded. In the region of an action section, the engagement member has a cradle edge which is adjoined by a wedge face. A supporting segment which is arranged either on the engagement member or on a groove bottom has a cone tip which lies in the direction of the torsion axis and forms a zero point contact which does not oscillate during welding.

The torsional sonotrodes which are disclosed in WO 2011/138404 A1 comprise projections which have working faces in the circumferential region. In each case one annular face which lies on a node line with regard to a wavelength of a natural oscillation of the torsional sonotrode is provided on both sides of the working faces. In one exemplary embodiment, a supporting device engages around said annular faces. Pressure forces are generated with the aid of a pressure device.

In the exemplary embodiment of WO 2012/069413 A1, a torsional oscillator is surrounded at a longitudinal position behind a sonotrode by a clamping ring which forms a bearing for the torsional oscillator. Said clamping ring is typically arranged at an oscillation node.

All said known supporting devices have the disadvantage, however, that the position of the oscillation node is dependent on the forces and torques which act on the sonotrode head. Generally speaking, an oscillation node can be displaced by several millimeters. This leads to undesired removal of the ultrasonic energy and the associated disadvantages which have already been described above.

It is therefore an object of the present invention to provide a device for welding components by means of ultrasound, which device does not have the abovementioned disadvantages. In particular, a sonotrode of the device is therefore to be supported in such a way that no appreciable removal of the ultrasonic energy occurs, to be precise independently of which forces or torques act on the sonotrode head.

Said object and further objects are achieved in accordance with a first aspect of the invention by way of a device for welding components by means of ultrasound, which device comprises a sonotrode with a sonotrode head and a supporting device. The sonotrode head can be excited to perform torsional oscillations with regard to a torsion axis by an oscillation generator. In accordance with the first aspect of the invention, at least one welding face is arranged on the sonotrode head on the circumferential side with regard to the torsion axis. The supporting device supports the sonotrode head in a supporting region which contains an oscillation node of the sonotrode head.

In accordance with the first aspect of the invention, the supporting region and the welding face run at least partially in a common plane which extends perpendicularly with respect to the torsion axis. This embodiment has the advantage that the position of the oscillation node is in practice not dependent on which forces or torques act on the welding face. Independently of said forces or torques, no appreciable removal of the ultrasonic energy via the supporting device is therefore produced, with the result that a greater proportion of the ultrasonic energy is available for the actual purpose of welding.

The supporting region advantageously forms only an inner (with regard to the torsion axis) region of the sonotrode head. Since the amplitude of the torsional oscillations is smaller in said inner region than in outer regions, the ultrasonic energy which is removed at the supporting device can be reduced again as a result.

In accordance with a second independent aspect of the invention, the device is likewise designed for welding components by means of ultrasound and comprises a sonotrode with a sonotrode head which can be excited to perform torsional oscillations with regard to a torsion axis by an oscillation generator, and a supporting device which supports the sonotrode head in a supporting region which contains an oscillation node of the sonotrode head. In accordance with the second aspect, however, a welding face does not necessarily have to be arranged on the sonotrode head on the circumferential side with regard to the torsion axis; instead, at least one welding face can also be arranged on an end face of the sonotrode head, which end face is perpendicular with respect to the torsion axis. In accordance with the second aspect, the supporting region and the welding face also do not necessarily have to run at least partially in a common plane which extends perpendicularly with respect to the torsion axis.

In accordance with the second aspect, the sonotrode has a bore which penetrates the supporting region substantially perpendicularly with respect to the torsion axis, and the supporting device comprises a supporting pin which runs through the bore and supports the sonotrode in the supporting region in the bore. Here and in the following text, a penetration "substantially perpendicularly with respect to the torsion axis" is understood to mean that the bore penetrates the supporting region at an angle of from 80° to 100°. Said angle preferably lies in the range from 85° to 95°, further preferably from 89° to 91°, and is very particularly preferably 90°. This is because the closer said angle lies to 90°, the less ultrasonic energy is removed. In this way, the support can be realized particularly simply only in an inner (with regard to the torsion axis) region of the sonotrode head, as a result of which the advantages which have already been explained above can be achieved. As has been shown in a completely surprising manner, the acoustic properties of the sonotrode are not influenced disadvantageously by the bore which penetrates it and by the supporting pin which runs through the latter. A supporting pin of this type has the advantage that the sonotrode can be used precisely, in particular when the sonotrode is repositioned or replaced.

It is conceivable and lies within the context of the invention that the sonotrode and the supporting pin are configured in one piece with one another. However, the sonotrode and the supporting pin are advantageously two separate components which have been joined together. The supporting pin can support the sonotrode in the supporting region in the bore, for example, by way of a transition fit, shrinking or pressing in.

The supporting pin particularly advantageously intersects the torsion axis. In this way, the supporting pin can support the inner (with regard to the torsion axis) region of the sonotrode head particularly effectively.

In order to make a support possible only in an inner (with regard to the torsion axis) region of the sonotrode head, the bore can taper in the direction of the supporting region. This wording comprises both conical regions of the bore and embodiments, in which the bore is cylindrical both in the supporting region and in two opening sections which lie opposite one another and in which the bore opens out of the sonotrode, the bore having a first inner diameter in the supporting region, however, which first inner diameter is smaller than a second inner diameter of the bore in the opening sections. Step-shaped regions of this type are easier to manufacture than conical regions.

As an alternative or in addition, the supporting pin can widen in the direction of the supporting region. In an analogous manner, this wording also comprises supporting pins with a middle region with a first outer diameter and two end regions with second outer diameters which are smaller than the first outer diameter. The longer the supporting region, the more stable the support. Secondly, as the length of the supporting region increases, increasing and undesired damping of the torsional oscillations is also produced, however. It has proven advantageous in practice if the length of the supporting region along the supporting pin is between 10% and 30%, preferably between 20% and 25% of the extent of the sonotrode head along the supporting pin.

In further advantageous embodiments, the supporting pin can have two ends which lie opposite one another and are received in each case one bearing opening. In this way, forces and torques which are produced during welding can be transmitted to the bearing system. Each of the bearing openings can be configured as an opening of an in each case single-piece bearing bush. As an alternative, each of the bearing openings can be formed by way of two bearing parts, for example by way of a bearing block and a clamping claw. The supporting pin is particularly simply accessible by way of release of clamping claws of this type from the bearing block, for example in order to transfer the sonotrode into another position, in which another welding face can be used for welding.

The device particularly advantageously comprises a bearing block which is in one piece, in particular, and at least partially forms the two said bearing openings. A single-piece bearing block of this type is particularly simple in structural terms. As an alternative to this, however, it is also conceivable and likewise lies within the scope of the invention that the two bearing bushes are not configured in one piece with one another.

Furthermore, the device can comprise a pressure device for generating forces which act substantially perpendicularly with respect to the torsion axis on the bearing block. Here and in the following text, "forces which act substantially perpendicularly with respect to the torsion axis" is understood to mean that the angle between the forces and the torsion axis lies in the range from 70° to 110°, preferably from 80° to 100°, particularly preferably from 85° to 95°, and is very particularly preferably 90°. In this way, the welding face can be pressed onto a first component which is to be connected to a second component. On account of the supporting device according to the invention, the forces which are generated by the pressure device do not bring about any appreciable displacement of the position of the oscillation node.

The supporting pin can be configured as a hollow pin or else can consist of solid material. A hollow pin has the advantage of improved oscillation damping, whereas a pin which consists of a solid material is more stable mechanically.

In a third independent aspect, the invention relates to a device for welding components by means of ultrasound, which device comprises a sonotrode with a sonotrode head which can be excited to perform oscillations by an oscillation generator, and a supporting device which supports the sonotrode head in a supporting region which contains an oscillation node of the sonotrode head.

The oscillation generator can be configured for exciting the sonotrode head to perform torsional oscillations with regard to a torsion axis. Here, at least one welding face can be arranged on the circumferential side with regard to the torsion axis, and/or at least one welding face can be arranged on an end face which is perpendicular with respect to the torsion axis. As an alternative, however, the oscillation generator can also be configured for exciting the sonotrode head to perform longitudinal oscillations.

In said third aspect of the invention, the device has a temperature control device for controlling the temperature of, in particular for cooling or for heating, the sonotrode head. The temperature control device comprises at least one temperature control feed for a temperature control medium, which temperature control feed is guided through the supporting device, and at least one temperature control element which is operatively connected to the temperature control feed and is preferably arranged in the region of a welding face of the sonotrode head. As will be explained further below, the operative connection can consist, for example, of a fluidic connection or an electric connection. Since the temperature control feed is arranged in the supporting device which supports the sonotrode head in a supporting region which contains an oscillation node of the sonotrode head, the temperature control feed is in practice not impaired by the ultrasonic oscillations. Cooling of the sonotrode head in the region of a welding face is particularly effective, since most heat is produced there during welding. Heating of the sonotrode head in the region of a welding face has also proven advantageous in some embodiments. Furthermore, the temperature control of the sonotrode head has the advantage that the temperature and therefore also the resonant frequency can be kept comparatively constant.

In some exemplary embodiments, the temperature control feed comprises at least one feed duct, through which a temperature control fluid can be introduced into the sonotrode head or can be discharged from the sonotrode head. In said exemplary embodiments, the temperature control fluid forms the temperature control medium. The temperature control fluid, in particular a cooling fluid or heating fluid, can be, for example, a gas or a liquid, such as water. The at least one feed channel can open from the supporting device at openings. The temperature control fluid can be introduced through a first opening, and can be discharged again from a second opening. The temperature control element can comprise at least one temperature control duct for the temperature control fluid, which temperature control duct is fluidically connected to the feed duct.

As an alternative, the temperature control medium can be an electric current. The latter can be introduced into the sonotrode head by way of an electric line which is arranged in the supporting device, the electric line forming the temperature control feed. The temperature control element can be an electric temperature control element which is connected electrically to the electric line. The electric temperature control element can be configured, for example, as a Peltier element, in order to cool or to heat the sonotrode head, and/or as a heating wire, in order to heat the sonotrode head.

In one possible embodiment, the supporting device comprises an above-described supporting pin which is configured as a hollow pin and forms the temperature control feed with a feed duct contained therein for a temperature control fluid. The feed duct can be arranged, for example, in a centered manner in the hollow pin and can be of cylindrical configuration. The at least one feed duct can open at openings which can be arranged at opposite ends of the supporting pin or else can open at the same end of the supporting pin. If, in accordance with the first aspect of the invention, the supporting region and the welding face run at least partially in a common plane which extends perpendicularly with respect to the torsion axis, the at least one feed duct and the temperature control duct can be formed by way of a common bore in the supporting pin, which common bore can be cylindrical throughout.

In other embodiments, an electric line can be guided through the supporting pin, in order, for example, to supply a Peltier element which is arranged in the sonotrode head with current.

The first aspect of the invention also includes devices, in which the sonotrode is supported in the supporting region in a different way than by way of a bore and a supporting pin.

The sonotrode head can have at least one, preferably a plurality of projections which are radial with regard to the torsion axis and at the ends of which in each case one welding face is formed. With the aid of radial projections of this type, great torsional oscillation amplitudes can be achieved at the welding faces, without it being necessary for the sonotrode head overall to have a greater radius.

It is of advantage, furthermore, if the sonotrode head has precisely two projections which are radial with regard to the torsion axis, lie opposite one another, and at the ends of which in each case one welding face is formed, the supporting pin running substantially perpendicularly with respect to a connecting line which connects the two welding faces to one another. Here, a "substantially perpendicular" course is understood to mean that the angle between the supporting pin and the connecting line lies in the range from 70° to 110°, preferably from 80° to 100°, particularly preferably from 85° to 95°, and is very particularly preferably 90°. A substantially perpendicular course of this type ensures a further improved transmission of forces and torques by way of the supporting device.

Figure 1B:
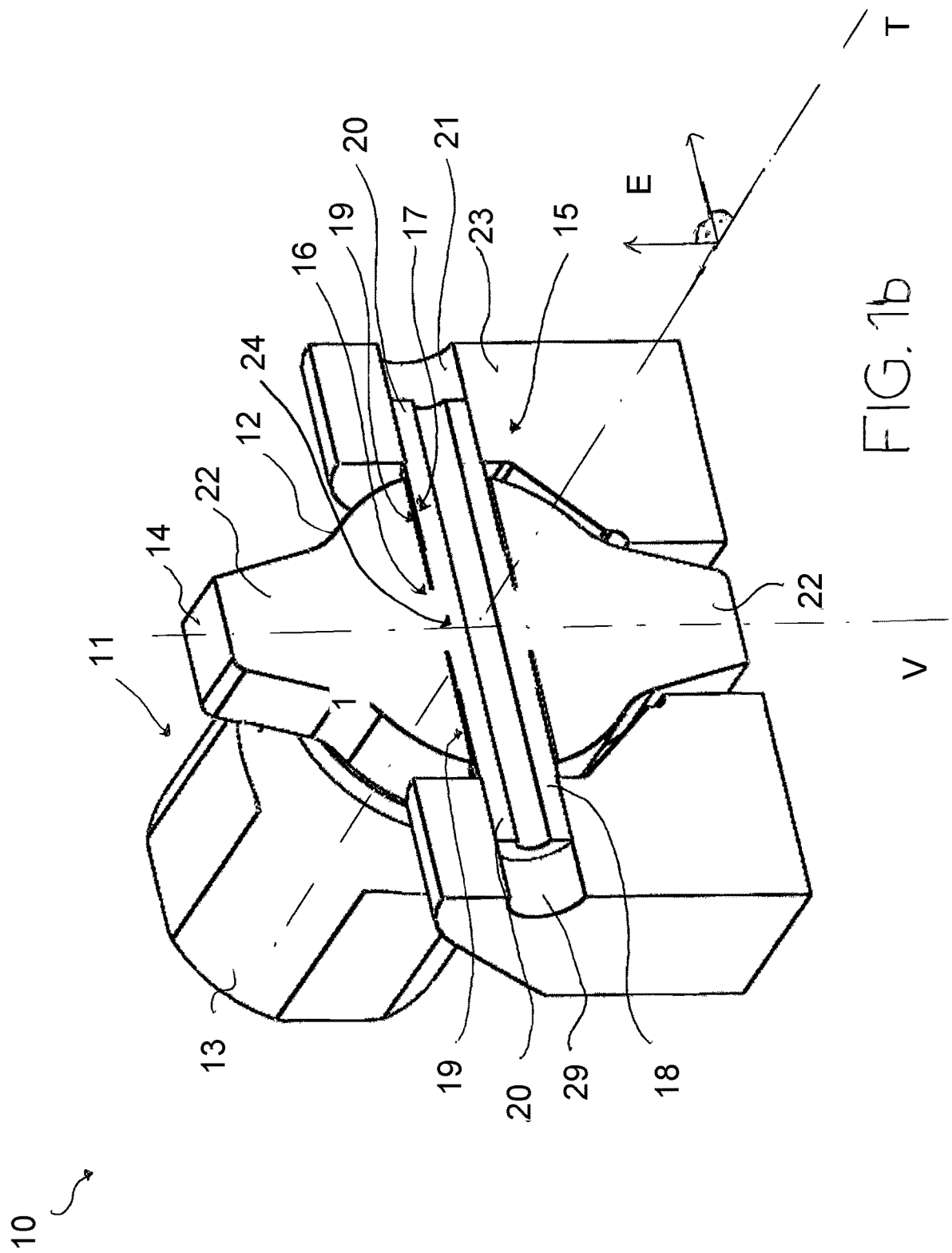
Figure 2A:
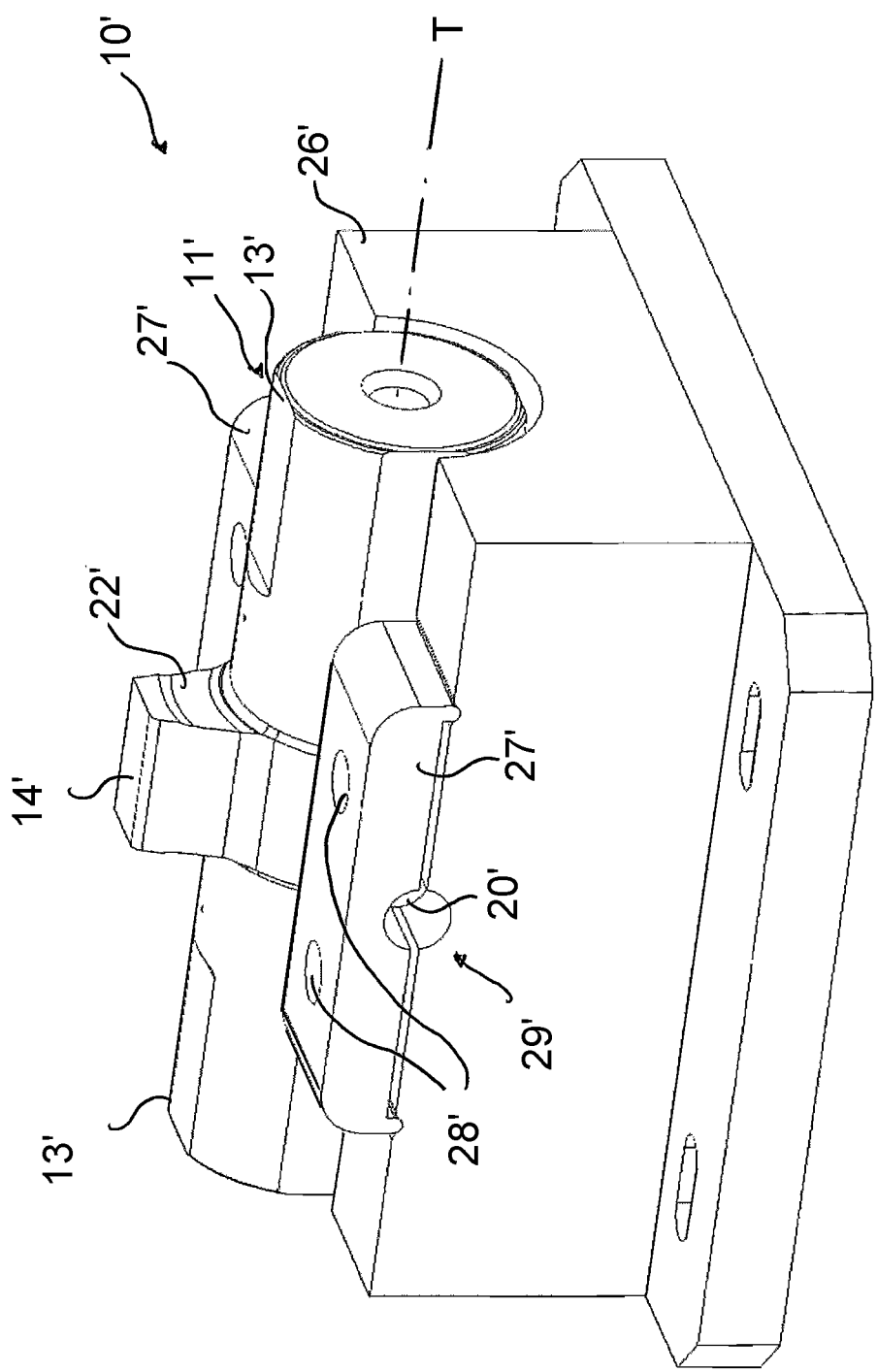
Figure 2B:
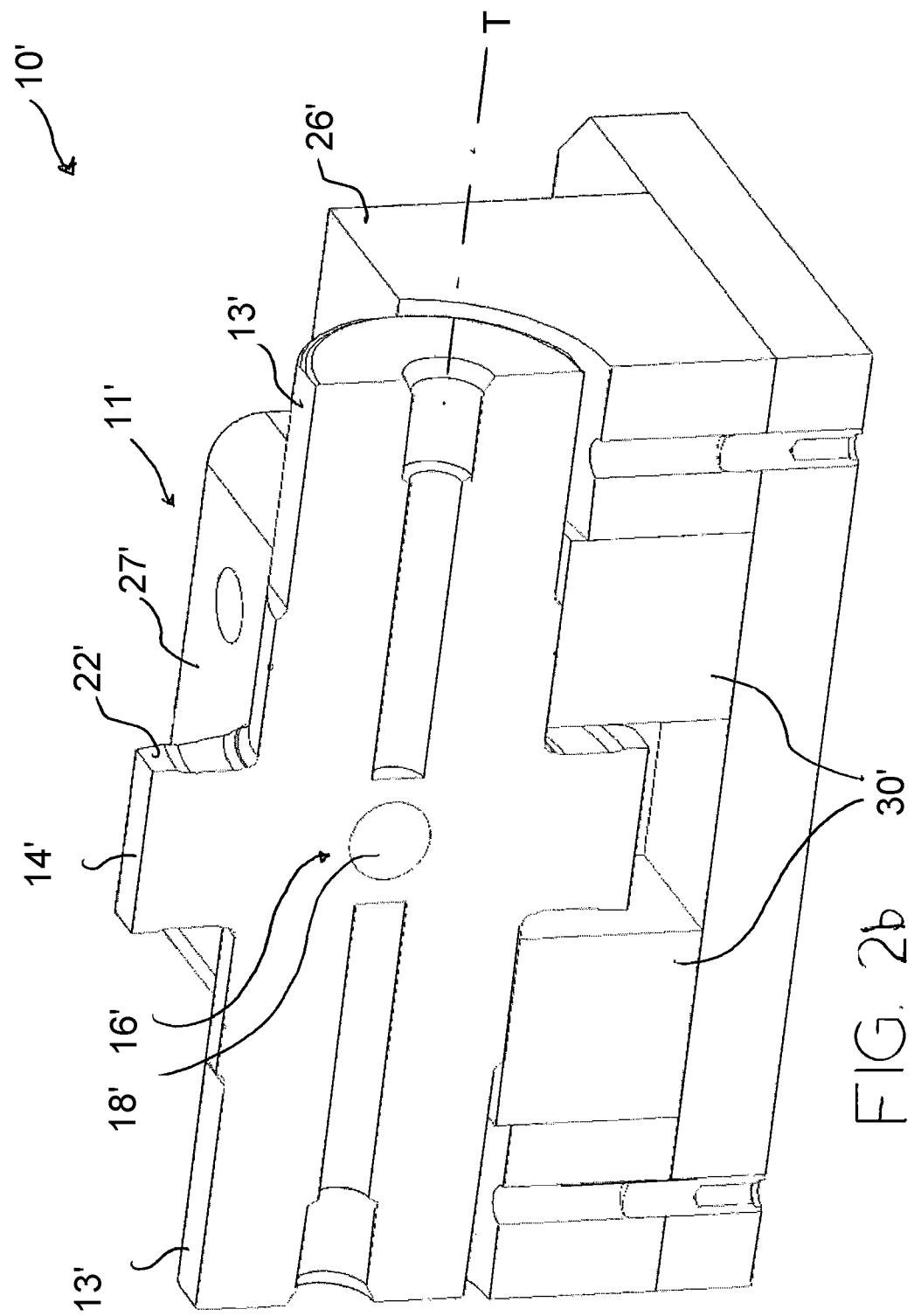
Figure 2D:
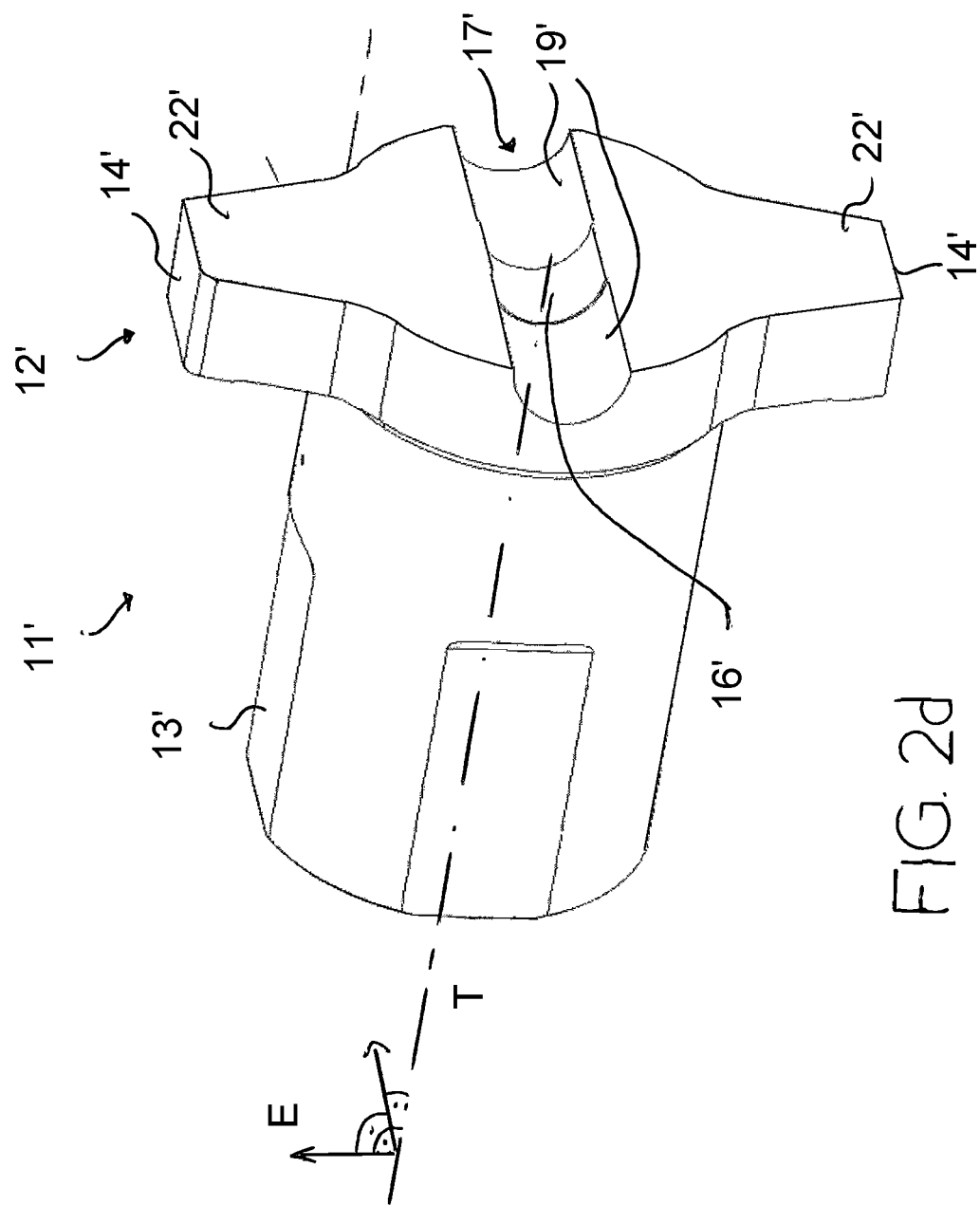
Figure 2E:
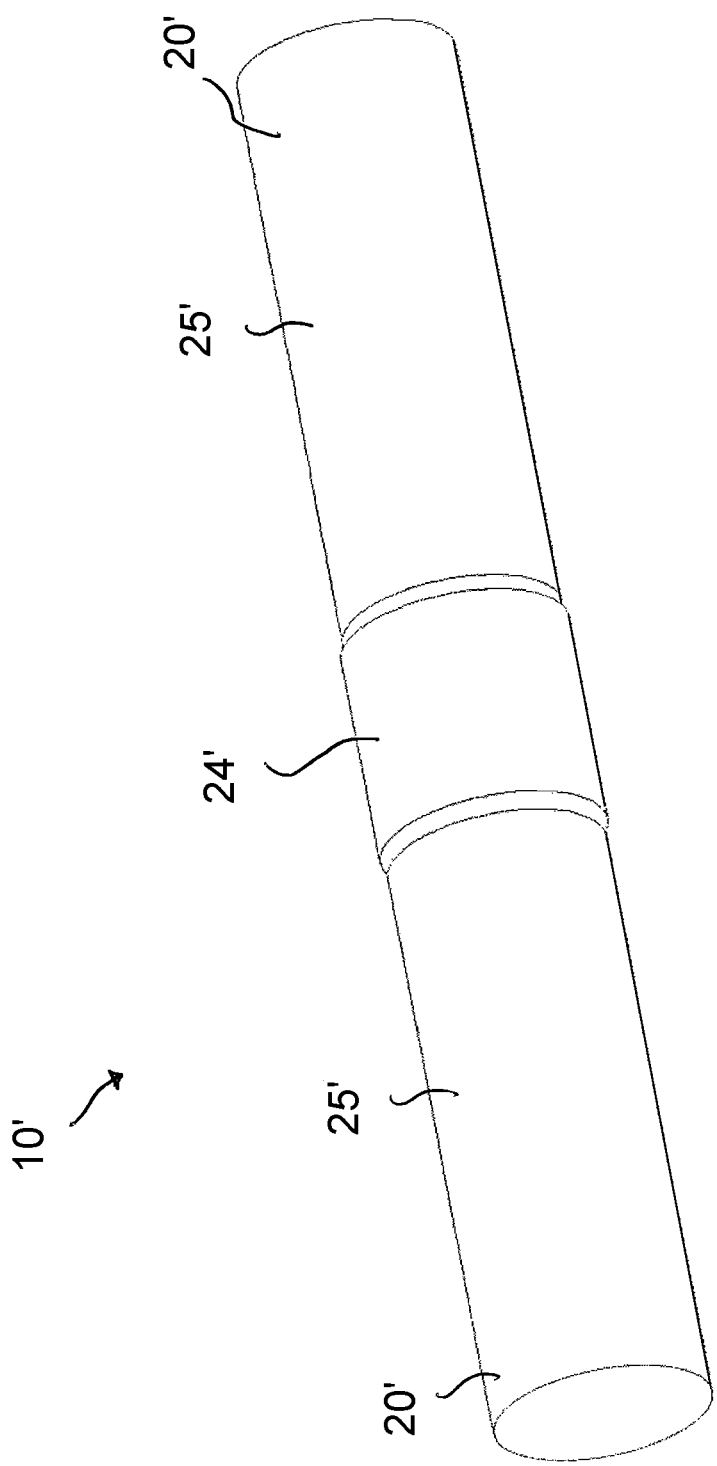
Figure 3:
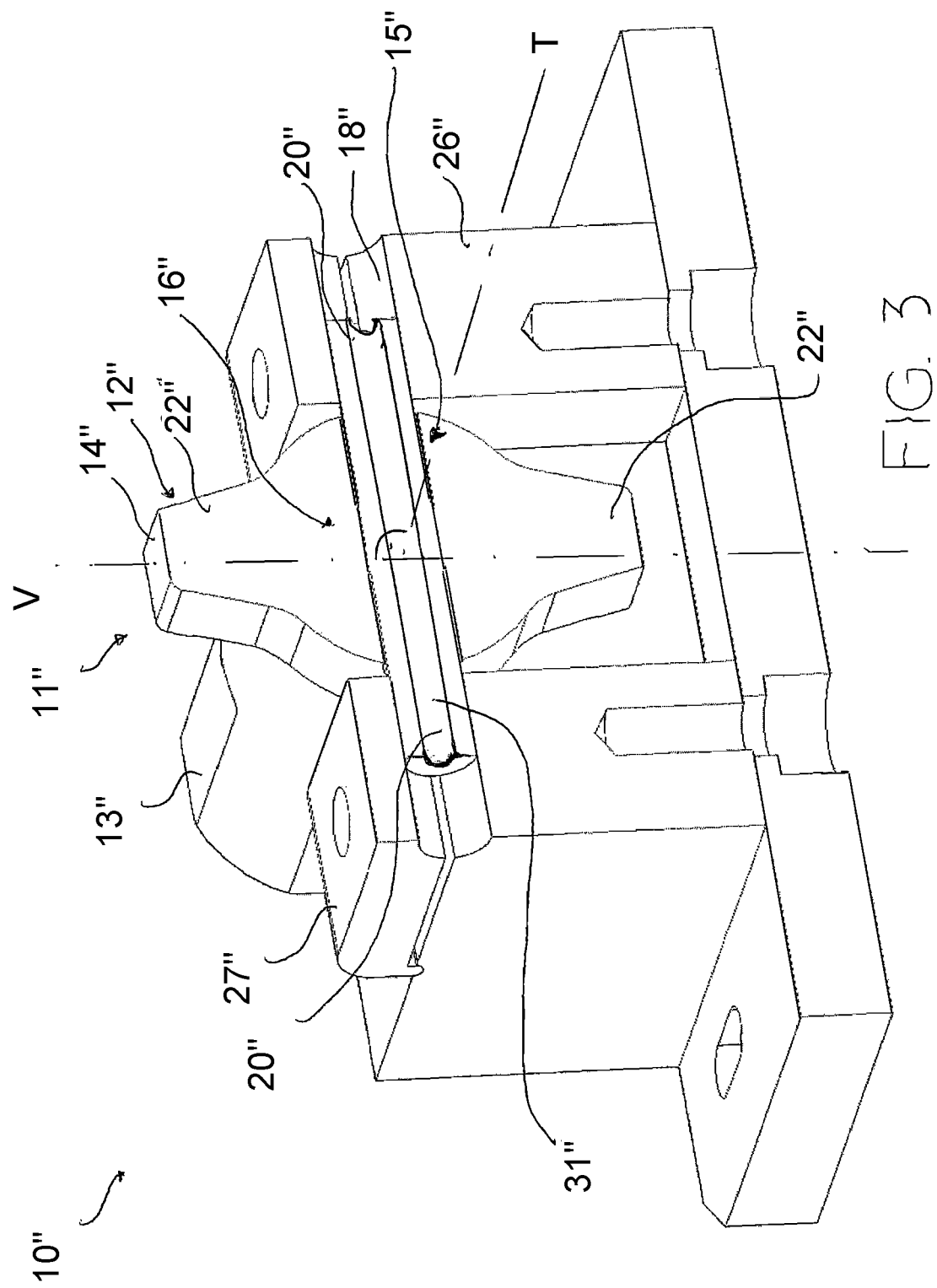
Figure 4:
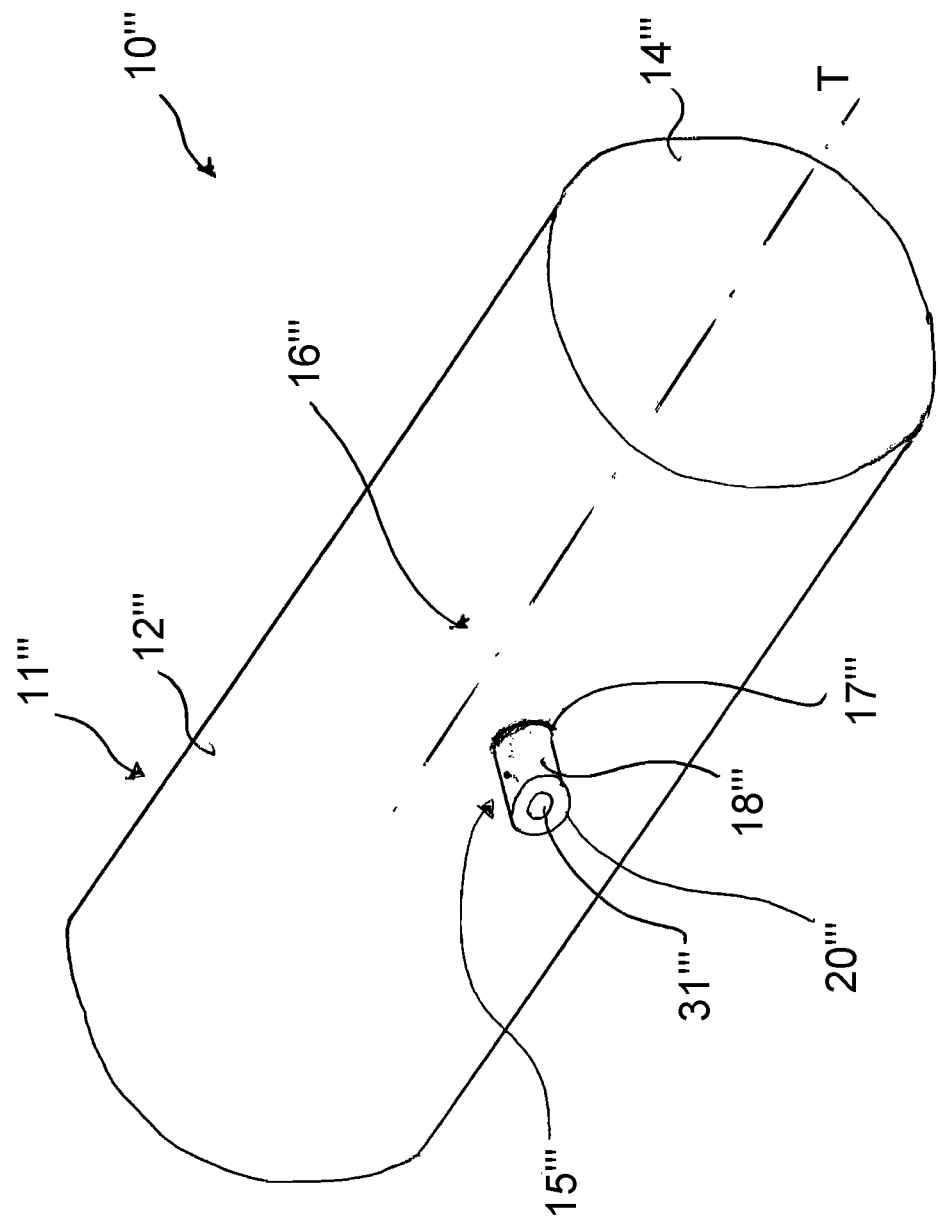

In the following text, the invention will be described in detail using a plurality of exemplary embodiments and drawings, in which:

FIG. 1a shows a diagrammatic illustration of a first device according to the invention in a perspective view, FIG. 1b shows the device according to FIG. 1a in a sectional view, FIG. 2a shows a second device according to the invention in a perspective view, FIG. 2b shows the device according to FIG. 2a in a first sectional view, FIG. 2c shows the device according to FIGS. 2a and 2b in a second sectional view, FIG. 2d shows a sectional view of the sonotrode of the device according to FIGS. 2a to 2c, FIG. 2e shows a perspective view of the supporting pin of the device according to FIGS. 2a to 2d, FIG. 3 shows a third device according to the invention in a sectional view, and FIG. 4 shows a perspective view of a fourth device according to the invention with a welding face which is arranged on an end face of a sonotrode head.

The device 10 which is shown in the diagrammatic FIG. 1a for welding components by means of ultrasound comprises a sonotrode 11 with two end pieces 13 and a sonotrode head 12 which is arranged in between and can be excited to perform torsional oscillations with regard to a torsion axis T via the end pieces 13 with the aid of oscillation generators (not shown here). The sonotrode head 12 has two projections 22 which are radial with regard to the torsion axis T and lie opposite one another. In each case one welding face 14 is formed at the ends of the projections 22, by way of which welding face 14 a first component can be connected to a second component by way of welding. The two welding faces 14 are therefore arranged on the circumferential side with regard to the torsion axis T. Furthermore, the device 10 comprises a supporting device 15 which supports the sonotrode head 12 in a supporting region. Said supporting region which is shown in further detail in FIG. 1b contains an oscillation node of the sonotrode head 12.

The sectional view according to FIG. 1b shows details of the supporting device 15. The sonotrode 11 has a cylindrical bore 17 which penetrates the supporting region 16 perpendicularly with respect to the torsion axis T and also perpendicularly with respect to a connecting line V which connects the two welding faces to one another. Furthermore, the supporting device 15 comprises a supporting pin 18 which runs through the bore 17 and the middle region 24 of which supports the sonotrode 11 in the supporting region 16 in the bore 17. The supporting pin 18 widens in the direction of its middle region 24. In the exemplary embodiment which is shown here, the length of the supporting region 16 along the supporting pin 18 is approximately 20% of the extent of the sonotrode head 12 along the supporting pin 18. The supporting pin 18 is held in the sonotrode 11 by way of being pressed into the bore 17. This can be achieved, for example, by way of a cold shrinking process, in which the supporting pin 18 is shrunk by way of cooling and is then introduced through the bearing openings 29 into the bore 17. During the subsequent reheating operation, the supporting pin 18 is pressed into the bore.

In this way, the sonotrode 11 is supported only in an inner (with regard to the torsion axis T) region of the sonotrode head 12. In other words, the supporting region 16 forms only an inner (with regard to the torsion axis T) region of the sonotrode head 12. The supporting region 16 and the welding face 14 run in a common plane E which extends perpendicularly with respect to the torsion axis T.

As a result of said embodiment according to the invention, the position of the oscillation node is in practice not dependent on which forces or torques act on the welding faces 14. Independently of said forces or torques, no appreciable removal of the ultrasonic energy is produced via the supporting device 15, with the result that a greater proportion of the ultrasonic energy is available for the actual purpose of welding.

In this exemplary embodiment, the supporting pin 18 is configured as a hollow pin 18. As an alternative, however, the supporting pin 18 can also consist of solid material.

The supporting pin 18 has two ends 20 which lie opposite one another and are received in each case one bearing opening 29 of a bearing bush 21 of a common, single-piece bearing block 23. In this way, forces and torques can be transmitted to the bearing block. The supporting pin 18 permits particularly precise positioning of the sonotrode head 12.

Furthermore, the device 10 can comprise a pressure device (not shown here) for generating forces K which act perpendicularly with respect to the torsion axis T on the bearing block 23. In this way, one of the welding faces 14 can be pressed onto a first component which is to be connected to a second component.

FIGS. 2*a* to 2*e* show a second device 10' according to the invention for welding components by means of ultrasound.

According to FIG. 2*a*, the device 10' comprises a bearing block 26' with a channel-shaped recess, in which a sonotrode 11' is received. Said sonotrode 11 also comprises two end pieces 13' with a sonotrode head 12' which is arranged in between with two projections 22', at the ends of which in each case one welding face 14' is present. Via the end pieces 13', the sonotrode head 12' can be excited to perform torsional oscillations with regard to a torsion axis T by means of two oscillation generators (not shown). Two opposite ends 20' of a supporting pin 18' are fastened to the bearing block 26' with the aid of clamping claws 27'. The clamping claws 27' are fixed on the bearing block 26' by means of bolts which are inserted into screw openings 28'. The supporting pin 18' is particularly simply accessible by way of the release of the clamping claws 27' from the bearing block 26'. Forces K which act perpendicularly with respect to the torsion axis T can be exerted on the bearing block 26' by means of a pressure device (not shown here), for example a pneumatic cylinder, as a result of which the welding face 14' can be pressed onto a first component which is to be connected to a second component.

As can be seen in the sectional view according to FIG. 2*b*, the device 10' comprises two supports 30', by way of which the end pieces 13' of the sonotrode 11' are held. Said two supports 30' can consist, for example, of laminated fabric boards. They likewise comprise a channel-shaped depression for supporting the end pieces 13'. The position of the sonotrode 11' can be set particularly precisely with the aid of the supports 30'.

As can be gathered from the sectional view in FIG. 2*c*, the sonotrode 11' has a bore 17' which intersects the torsion axis T and in the process penetrates the sonotrode head 12' perpendicularly with respect to the torsion axis T and also perpendicularly with respect to a connecting line V which connects the two projections 22'. A supporting pin 18' is inserted into the bore 17', which supporting pin 18' supports the sonotrode 11' in a supporting region 16' in the bore 17'. Here, the supporting pin 18' is held by way of a transition fit, with the result that it can be replaced if required, for example if it is worn, bent or broken. There is an oscillation node of the sonotrode head 12' in the supporting region 16'.

FIG. 2*d* shows a detailed perspective sectional view of the sonotrode head 12'. As can be seen clearly here, the bore 17' has a first inner diameter in the supporting region 16', and it has a second inner diameter in two opening sections 19' which lie opposite one another, which second inner diameter is larger than the first inner diameter. The bore 17' therefore tapers in the direction of the supporting region 16'.

FIG. 2*e* shows the supporting pin 18' in detail. In contrast to the supporting pin 18 of the first exemplary embodiment, said supporting pin 18' consists of a solid material. The supporting pin 18' comprises a middle region 24' with a first outer diameter and two end regions 25' which lie opposite one another with a second outer diameter which is smaller than the first outer diameter. The supporting pin 18' therefore widens in the direction of the middle region, in which it supports the sonotrode head 12'.

The length of the supporting region 16' along the supporting pin 18' is approximately 25% of the extent of the sonotrode head 12' along the supporting pin 18'.

Overall, as a result, the sonotrode head 12' is supported only in an inner (with regard to the torsion axis T) region of the sonotrode head 12'. Furthermore, the supporting region 16' and the two welding faces 14' run in a common plane E which extends perpendicularly with respect to the torsion axis T. This configuration according to the invention has the advantages which have already been described above.

In order for it to be possible to use the welding face 14' which is shown at the bottom in FIGS. 2*a* to 2*c*, first of all the clamping claws 27' can be released from the bearing block 26'. On account of the centering action of the bore 17' and the supporting pin 18' and on account of the overall symmetrical arrangement, the sonotrode 11' can then be rotated simply together with the supporting pin 18' by 180° about the torsion axis T, with the result that the ends 20' are received again in the bearing openings 29'. Subsequently, the clamping claws 27' can be fastened to the bearing block 26' again. Said positioning is extremely precise on account of the supporting pin 18'.

In the third device 10" according to the invention which is shown in FIG. 3, in contrast to the device 10' which is shown in FIGS. 2*a* to 2*e*, the supporting pin is configured as a hollow pin 18". It has a centered and continuously cylindrical duct 31", through which a temperature control fluid, in particular a cooling medium or a heating medium, for example water, can be guided into, through and out of the sonotrode head 12" again. In this way, temperature control, in particular cooling or heating, of the sonotrode head 12" in the region of the welding faces 14" can be achieved. The duct 31" opens at openings 32", 33" which are arranged at opposite ends 20" of the supporting pin 18". The temperature control fluid can be introduced through a first opening 32", and can be discharged again out of a second opening 33". The duct 31" therefore at the same time forms feed ducts for introducing and discharging the temperature control fluid and a temperature control duct for controlling the temperature. If a cooling medium is used, this embodiment permits cooling of the sonotrode 11" in the region of the welding faces 14", at which most heat is produced during welding.

FIG. 4 diagrammatically shows a fourth exemplary embodiment according to the invention, in which a welding face 14''' is arranged on an end face of the sonotrode head 12'''. A supporting pin 18''' is also provided here, which supporting pin 18''' supports the sonotrode 11''' in a supporting region 16''' in a bore 17'''. The ends 20''' of the supporting pin 18''' are held in two bearing openings (not shown here). The supporting pin 18''' comprises a feed duct 31''', through which a temperature control fluid can be introduced into the sonotrode head 12'''. In the interior of the sonotrode head 12''', temperature-controlled channels (likewise not shown here) which are fluidically connected to the feed duct 31''' are provided in the region of the welding face 14'''. In this way, the sonotrode head 11''' can be cooled in the region of the welding face 14'''.

The sonotrode head 12''' according to FIG. 4 can be capable of being excited to perform torsional oscillations with regard to a torsion axis T or to perform longitudinal oscillations, the supporting region 16''' containing a torsional or longitudinal oscillation node of the sonotrode head 12'''. On account of the arrangement of the supporting pin 18''' in this region, the feed of the temperature control fluid is not impaired.

The invention claimed is:

1. A device for welding components by ultrasound, comprising:
   a sonotrode with a sonotrode head which can be excited to perform oscillations by an oscillation generator,
   a supporting device which supports the sonotrode head in a supporting region which comprises an oscillation node of the sonotrode head,
   wherein the supporting device has a temperature control device for controlling a temperature of the sonotrode head, the temperature control device comprises at least one temperature control feed for a temperature control medium, which temperature control feed is guided through the supporting device, and at least one temperature control element which is operatively connected to the temperature control feed.

2. The device as claimed in claim 1, wherein the temperature control device is a temperature control device for cooling or for heating the sonotrode head.

3. The device as claimed in claim 1, wherein the temperature control feed comprises at least one feed duct, through which a temperature control fluid is introduced into the sonotrode head or can be discharged from the sonotrode head, and the temperature control element comprises at least one temperature control duct for the temperature control fluid, which temperature control duct is fluidically connected to the feed duct.

4. The device as claimed in claim 3, wherein the sonotrode has a bore which penetrates the supporting region, and the supporting device comprises a supporting pin which runs through the bore and supports the sonotrode in the supporting region in the bore, and
   the supporting pin contains the feed duct, and the feed duct opens at openings which are arranged at opposite ends of the supporting pin.

5. The device as claimed in claim 1, wherein the sonotrode head is excited to perform torsional oscillations with regard to a torsion axis by the oscillation generator.

6. The device as claimed in claim 5, wherein the sonotrode head has at least one projection which is radial with regard to the torsion axis, and a welding face is formed at each end of the torsion axis.

7. The device as claimed in claim 6, wherein the at least one temperature control element is arranged in the region of the welding face.

8. The device as claimed in claim 6, wherein the sonotrode head has precisely two projections which are radial with regard to the torsion axis and which lie opposite one another, a respective welding face is formed at each end of the projections, the supporting pin runs substantially perpendicularly with respect to a connecting line which connects the two welding faced to one another.

9. The device as claimed in claim 5, wherein the welding face is arranged on the sonotrode head on a circumferential side with regard to the torsion axis, and where-in the supporting region and the welding face run at least partially in a common plane which extends perpendicularly with respect to the torsion axis.

10. The device as claimed in claim 6, wherein the supporting region forms only an inner (with regard to the torsion axis) region of the sonotrode head.

11. The device as claimed in claim 5, wherein the sonotrode has a bore which penetrates the supporting region substantially perpendicularly with respect to the torsion axis, and the supporting device comprises a supporting pin which runs through the bore and supports the sonotrode in the supporting region in the bore.

12. The device as claimed in claim 11, wherein the supporting pin supports the sonotrode in the supporting region in the bore by way of one of a transition fit, shrinking or pressing in.

13. The device as claimed in claim 11, wherein the supporting pin intersects the torsion axis.

14. The device as claimed in claim 11, wherein the bore tapers in a direction of the supporting region.

15. The device as claimed in claim 11, wherein the supporting pin widens in a direction of a middle region, in which the supporting pin supports the sonotrode head.

16. The device as claimed in claim 11, wherein a length of the supporting region along the supporting pin is between 10% and 30% of an extend of the sonotrode head along the supporting pin.

17. The device as claimed in claim 11, wherein the supporting pin has two ends which lie opposite one another, and each end is received in a respective bearing opening.

18. The device as claimed in claim 17, wherein the device comprises a bearing block which at least partially forms the two bearing openings.

19. The device as claimed in claim 18, wherein the device contains a pressure device for generating forces which act substantially perpendicularly with respect to the torsion axis on the bearing block, as a result of which the welding face can be pressed on to a first component which is to be connected to a second component.

20. The device as claimed in claim 18, wherein the bearing block is in one piece.

* * * * *